(12) United States Patent
Murakami

(10) Patent No.: US 8,289,704 B2
(45) Date of Patent: Oct. 16, 2012

(54) ELECTRONIC APPARATUS

(75) Inventor: Takeshi Murakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/092,336

(22) Filed: Apr. 22, 2011

(65) Prior Publication Data

US 2011/0210893 A1    Sep. 1, 2011

Related U.S. Application Data

(63) Continuation of application No. 12/588,799, filed on Oct. 28, 2009, now Pat. No. 7,957,136, which is a continuation of application No. PCT/JP2007/059304, filed on May 1, 2007.

(51) Int. Cl.
*G06F 1/16* (2006.01)
*H04B 1/38* (2006.01)
*H04M 1/00* (2006.01)
*H01Q 1/24* (2006.01)

(52) U.S. Cl. ............... 361/679.55; 361/679.26; 455/572; 455/575.1; 455/575.5; 455/575.7; 343/702

(58) Field of Classification Search .......... 361/679.01–679.45, 679.55–679.59, 361/724–727; 343/702; 349/58–60; 455/572–575.9, 90.1–90.3, 128, 347–351
See application file for complete search history.

(56) References Cited

U.S. PATENT DOCUMENTS 5,264,992 A   11/1993  Hogdahl et al.
5,764,477 A   6/1998   Ohgami et al.
6,625,013 B2  9/2003   Minaguchi et al.
6,742,070 B2  5/2004   Fuchida
6,944,429 B1  9/2005   Kitamura et al.
6,995,719 B2  2/2006   Ide et al.
7,142,886 B2  11/2006  Murayama et al.
7,782,601 B2* 8/2010   Cho ......................... 361/679.21

(Continued)

FOREIGN PATENT DOCUMENTS

EP    0987619    3/2000

(Continued)

OTHER PUBLICATIONS

Japanese Office Action issued Sep. 28, 2010, in corresponding Japanese Patent Application No. 2009-513890.

(Continued)

*Primary Examiner* — Jayprakash N Gandhi
*Assistant Examiner* — Nidhi Desai
(74) *Attorney, Agent, or Firm* — Fujitsu Patent Center

(57) ABSTRACT

An electronic apparatus includes: a housing having an internal space formed by top, bottom and side plates; and a power-source housing section formed next to a part of the side plate in the internal space and having a plate wall shaped such that a part adjacent to the side plate is near the side plate on one side and is away from the side plate on the other side in a direction connecting the top plate with the bottom plate. The apparatus further includes: a power-source block having an outer wall-surface whose shape conforms to the plate wall and housed in the power-source housing section; an antenna disposed in a space between the side plate and the plate wall; and a circuit board disposed in the internal space and mounted with an electronic circuit that operates based on power supplied from the power-source block housed in the power-source housing section.

6 Claims, 10 Drawing Sheets

U.S. PATENT DOCUMENTS

| | | | |
|---|---|---|---|
| 2004/0209646 A1* | 10/2004 | Murayama et al. | 455/556.1 |
| 2005/0012669 A1* | 1/2005 | Ide | 343/702 |
| 2007/0057852 A1* | 3/2007 | Leizerovich et al. | 343/702 |
| 2007/0252774 A1* | 11/2007 | Qi et al. | 343/866 |
| 2009/0058739 A1 | 3/2009 | Konishi | |

FOREIGN PATENT DOCUMENTS

| | | |
|---|---|---|
| JP | 55-119719 | 9/1980 |
| JP | 09-297631 | 11/1997 |
| JP | 2000-089855 | 3/2000 |
| JP | 2000-341018 | 12/2000 |
| JP | 2001-127518 | 5/2001 |
| JP | 2002-207535 | 7/2002 |
| JP | 2002-217754 | 8/2002 |
| JP | 2004-015246 | 1/2004 |
| JP | 2004-104333 | 4/2004 |
| JP | 2006-052471 | 2/2006 |
| WO | WO-2007-100001 | 9/2007 |

OTHER PUBLICATIONS

English Translation of the International Preliminary Report on Patentability mailed Dec. 3, 2009, in corresponding International Patent Application No. PCT/JP2007/059304.

International Search Report for PCT/JP2007/059304, mailed Aug. 7, 2007.

USPTO, Notice of Allowance and Notice of Allowability, Mar. 25, 2011, in parent U.S. Appl. No. 12/588,799 [now allowed].

USPTO, Non-Final Rejection, Oct. 14, 2010, in parent U.S. Appl. No. 12/588,799 [now allowed].

* cited by examiner

ELECTRONIC APPARATUS

CROSS-REFERENCE TO RELATED APPLICATION

This application is a continuation of application Ser. No. 12/588,799, filed Oct. 28, 2009, which is a continuation application of PCT/JP2007/059304, filed on May 1, 2007, the entire contents of which are incorporated herein by reference.

FIELD

The embodiment discussed herein is related to an electronic apparatus capable of wirelessly communicating with an external device.

BACKGROUND

Conventionally, there is known a wireless Local Area Network (LAN) implemented by connection among computers through wireless communications based on the IEEE 802.11 standard and the like in a local area such as an office. According to the wireless LAN, it is possible to implement, for example, a network making use of portability that is the greatest advantage of a notebook personal computer (hereinafter referred to as "notebook PC") that have become widespread in recent years. In order to use such a wireless LAN through a notebook PC, the notebook PC needs to have an antenna for wireless communication and a wireless system including a communication module that executes communication processing based on the IEEE 802.11 standard and the like. Therefore, in recent years, a notebook PC that contains such a wireless system has appeared in the market (for example, see Japanese Patent Laid-open Publications No. 2000-341018, No. 2002-207535, No. 2004-015246 and No. 2006-052471).

Meanwhile, besides the above-described wireless LAN, there is a wireless Personal Area Network (PAN) implemented in an area smaller than that of the wireless LAN, such as an interconnection between a portable telephone and a notebook PC through wireless communication. In late years, there have been introduced a notebook PC that contains, in addition to the wireless system for the wireless LAN, a wireless system compliant with Bluetooth (registered trademark) that is an example of the communication standards of the wireless PAN. Further, in the field of notebook PCs, there is a movement for making a notebook PC contain: a wireless system for a wireless Wide Area Network (WAN) implemented in an area wider than that of the wireless LAN; and a wireless system for receiving the so-called "one-segment broadcasting" that has been a focus of attention as a simple version of the Digital Terrestrial Television Broadcasting. For this reason, there is a trend to increase the number of wireless systems built in a notebook PC.

An antenna for wireless communication is indispensable for a wireless system. Although the sizes of antennas have become smaller than before, it is still necessary to provide a space large enough to house an antenna. Therefore, finding room for housing an antenna is a concern when attempting to provide a notebook PC with a built-in wireless system. Meanwhile, the recent increase in the number of wireless systems built in a notebook PC has increased the number of built-in antennas. Further, if an antenna is carelessly disposed in a notebook PC, radio waves received by and transmitted from the antenna may electromagnetically interfere with an internal circuit, making it more difficult to provide a space for housing an antenna, which is already made difficult by the increase in the number of built-in antennas.

Providing a notebook PC with an additional space dedicated to housing of an antenna is a way of appropriately housing the antenna while avoiding electromagnetic interference. However, such a way increases the size of the notebook PC, impairing the portability.

Incidentally, the difficulty of providing a space for housing an antenna has been described so far by taking the notebook PC as an example. However, this is a problem that not only occurs in the notebook PC but also occurs in, for example, a Personal Digital Assistant (PDA) with a built-in wireless system or commonly occurs in any types of electronic device that generally meet this requirement.

SUMMARY

According to an aspect of the invention, an electronic apparatus includes:

a housing that has an internal space formed by a top plate, a bottom plate and a side plate;

a power-source housing section formed next to a part of the side plate in the internal space and having a plate wall in such a shape that a part adjacent to the side plate is close to the side plate on one side and is away from the side plate on the other side in a direction connecting the top plate with the bottom plate;

a power-source block having an outer wall surface in a shape that conforms to the plate wall and housed in the power-source housing section;

an antenna disposed in a space between the side plate and the plate wall; and a circuit board mounted with an electronic circuit that operates based on power supplied from the power-source block housed in the power-source housing section, the circuit board being disposed in the internal space.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

An embodiment of the present invention will be described with reference to the drawings.

Figure 1:
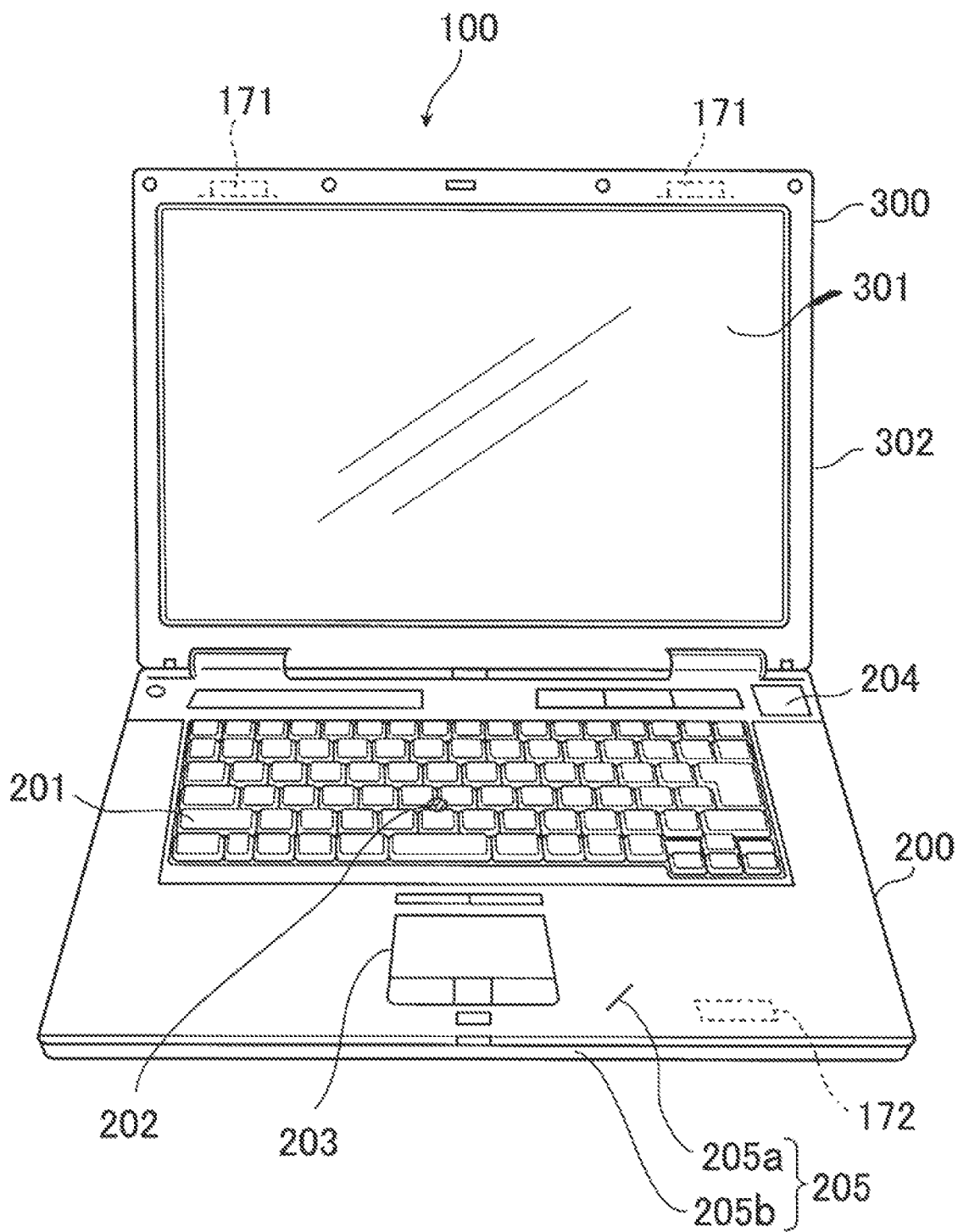
FIG. 1 is a diagram illustrating an external appearance of a notebook personal computer (notebook PC) that is an embodiment of the present invention.
Figure 2:
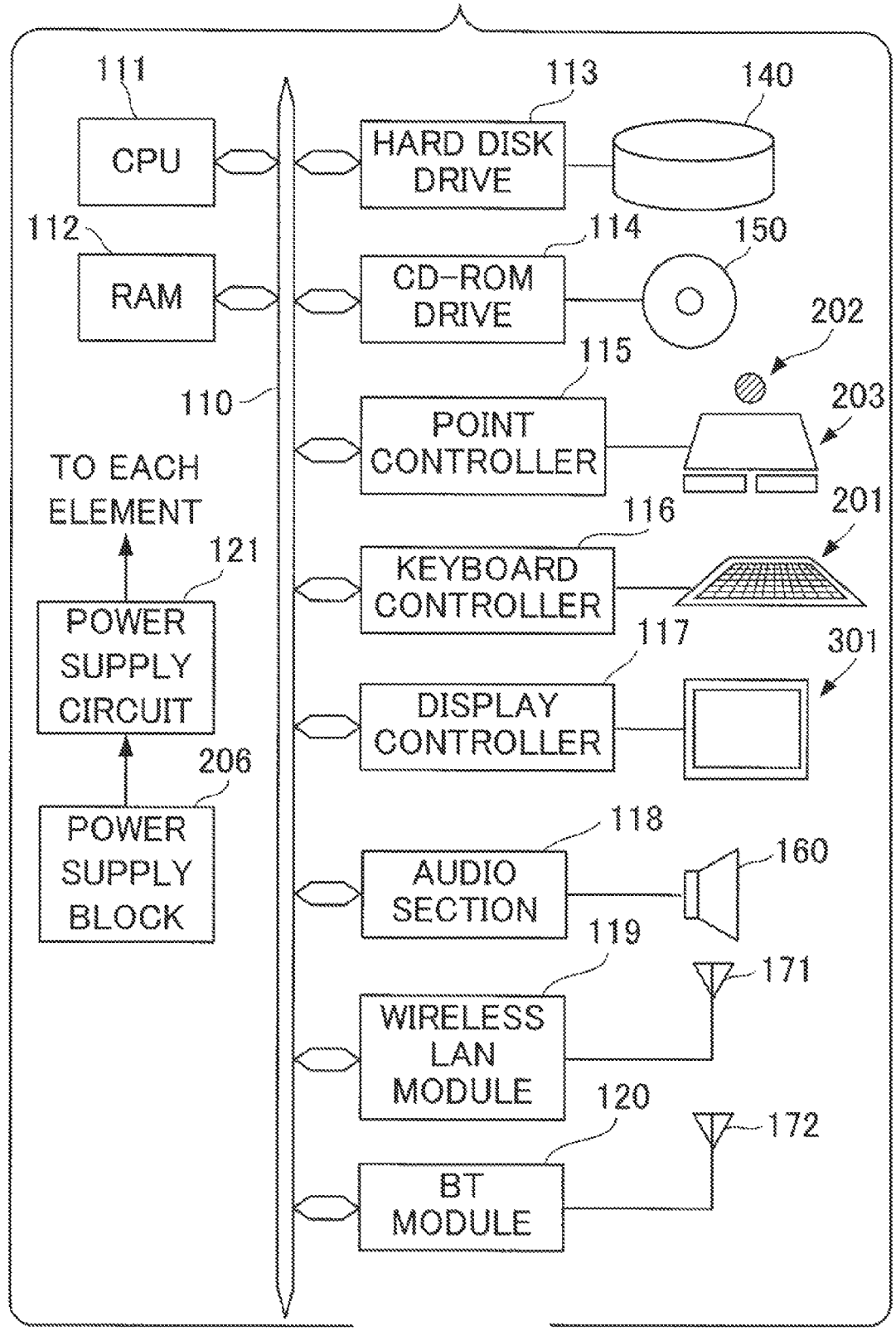
FIG. 2 is a hardware block diagram of the notebook PC.

FIG. 1 is a diagram illustrating an external appearance of a notebook personal computer (hereinafter, referred to as "notebook PC") 100 that is an embodiment of the present invention, and FIG. 2 is a hardware block diagram of the notebook PC 100.

The notebook PC 100 illustrated in FIG. 1 and FIG. 2 is adaptable to: a wireless Local Area Network (LAN) implemented by wireless communication based on the IEEE 802.11 standard and the like; and a wireless Personal Area Network (PAN) implemented by wireless communication based on the Bluetooth (registered trademark) standard and the like.

The notebook PC 100 includes a main unit 200 and a cover unit 300 that is openable and closable with respect to the main unit 200. The cover unit 300 is closed when the notebook PC 100 is not used, and opened when the notebook PC is used.

FIG. 1 illustrates a state in which the notebook PC 100 is used.

The main unit 200 includes a first housing 205 that has: a top plate 205*a* provided with components such as a keyboard 201, a stick point (pointer) 202, a flat point (pointer) 203 and a sound-emitting section 204 containing a speaker; a side plate 205*b* provided with elements such as a CD-ROM loading aperture into which a CD-ROM is inserted; and a bottom plate illustrated in other figures. The first housing 205 has an internal space. The main unit 200 contains a Bluetooth (BT) antenna 172 on the frontward side of the internal space of the first housing 205 as illustrated in FIG. 1. The antenna 172 is used for wireless communication based on the Bluetooth (registered trademark) standard, and disposed at a position that will be described later.

The cover unit 300 includes a second housing 302 that has a liquid crystal display (LCD) screen 301 disposed on an inner surface of the cover unit 300 in a closed state. The second housing 302 is openable and closable with respect to the first housing 205 of the main unit 200. The cover unit 300 contains two wireless-LAN antennas 171 for wireless communication based on the IEEE 802.11 standard, which are respectively disposed at the left end and the right end of an upper part of the second housing 302 in an open state.

Also, as illustrated in FIG. 2, the notebook PC 100 is provided with elements including: a CPU 111 that executes various programs; a RAM 112 where the program is expanded to be executed by the CPU 111; a Hard Disk Drive (HDD) 113 that accesses a hard disk 140 loaded therein; and a point controller 115 that transmits, to the CPU 111, information about operation of the stick point 202 and the flat point 203 that are also illustrated in FIG. 1. The notebook PC 100 is further provided with: a keyboard controller 116 that transmits information about operation of the keyboard 201 to the CPU 111; a display controller 117 that controls the display on the LCD screen 301 according to commands from the CPU 111; an audio section 118 that outputs sound from a speaker 160 disposed in the sound-emitting section 204 illustrated in FIG. 1 according to commands from the CPU 111; a wireless LAN module 119 that controls wireless communication through the wireless-LAN antennas 171 illustrated also in FIG. 1; and a communication module (BT module) 120 that controls wireless communication through the BT antenna 172 illustrated also in FIG. 1. These elements are interconnected via a bus 110.

The notebook PC 100 further includes a power supply circuit 121 that supplies each element with electric power provided by a power supply block (battery pack) 206 that is removably attachable as described later and electric power externally provided through a power cable (not illustrated).

A feature of the notebook PC 100 described above lies in a structure related to a wireless system compliant with the Bluetooth (registered trademark) standard. In particular, the feature is seen in the attached position of the antenna 172 and how to attach and detach the BT module 120. Therefore, the description will focus on the attached position of the antenna 172 and how to attach and detach the BT module 120.

In the notebook PC 100, the BT antenna 172 and the BT module 120 are disposed in the first housing 205 at a position closer to the bottom of the main unit 200.

Figure 3:
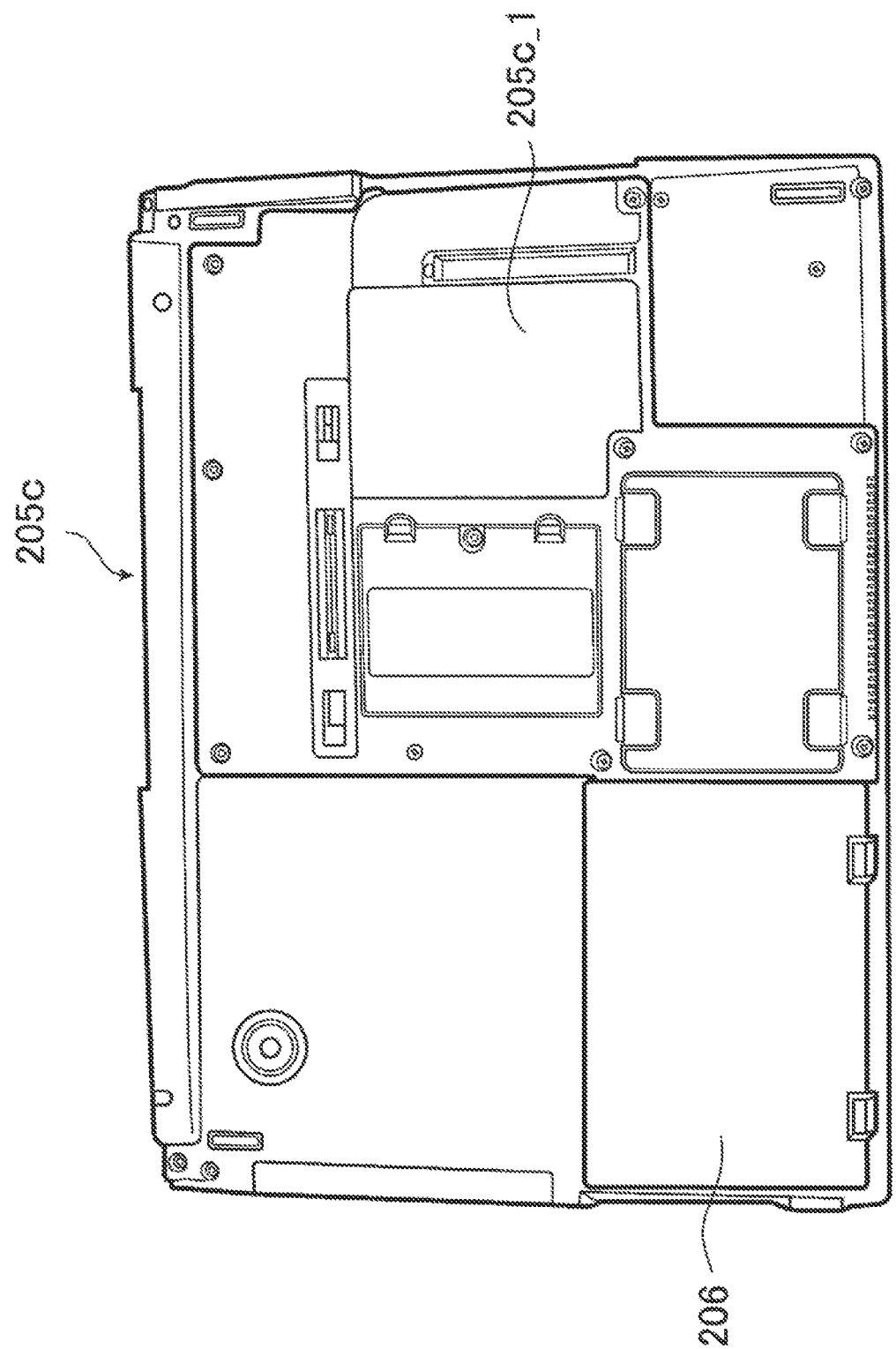
FIG. 3 is a diagram illustrating the back of a main unit 200 illustrated in FIG. 1.
Figure 4:
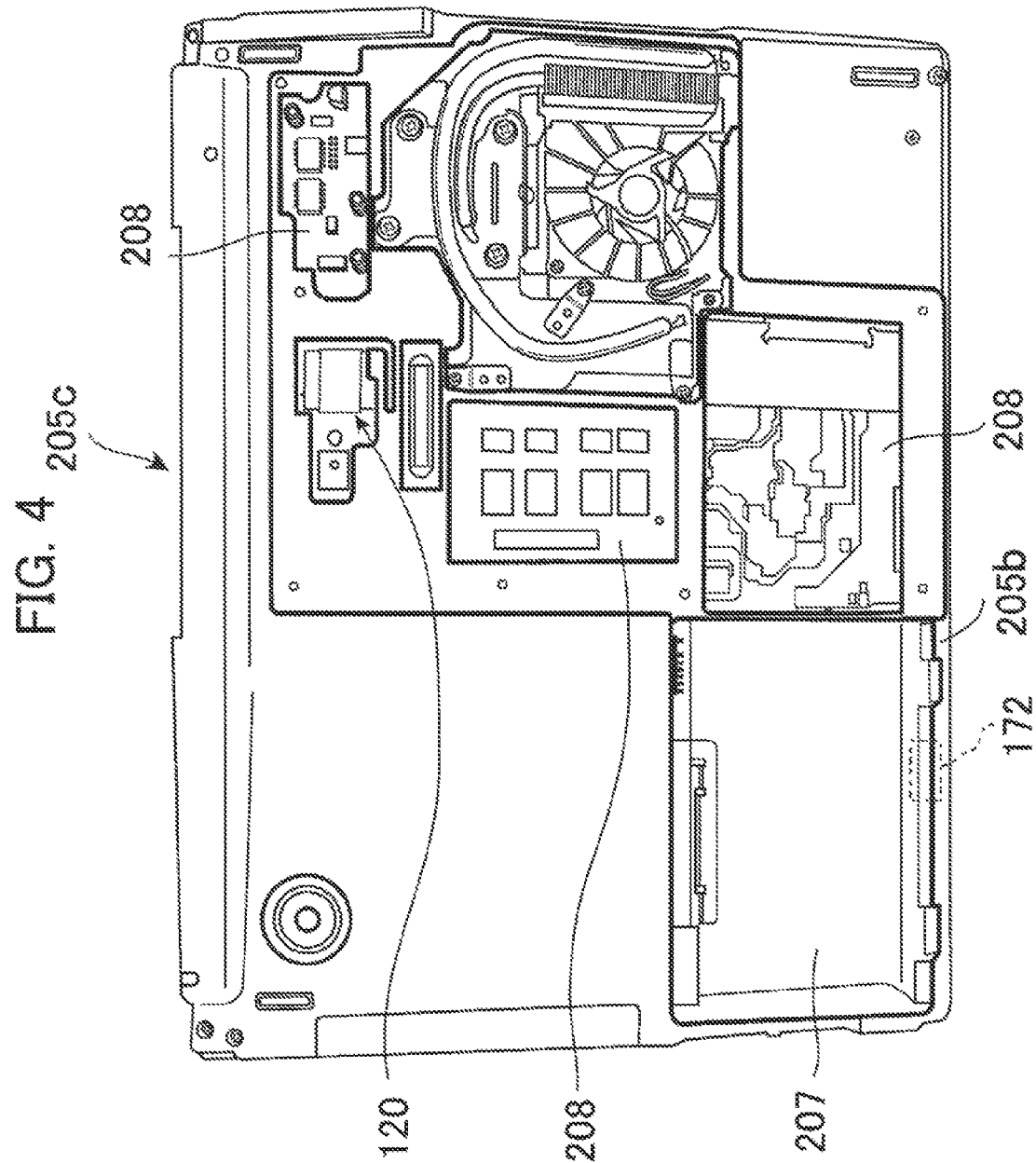
FIG. 4 is a diagram illustrating the bottom of the main unit 200 from which a panel and the like are removed so that the positions of a BT antenna 172 and a BT module 120 are visible.

FIG. 3 is a diagram illustrating the bottom of the main unit 200 in FIG. 1, and FIG. 4 is a diagram illustrating the bottom of the main unit 200 from which a panel and the like are removed so that the positions of the BT antenna 172 and the BT module 120 are visible.

FIG. 3 illustrates a state in which, to a bottom plate 205*c* that corresponds to the bottom of the main unit 200, the power supply block 206 illustrated also in FIG. 2 and a back panel 205*c*_1 that covers more than a half of the back are attached. FIG. 4 illustrates a state in which the power supply block 206 and the back panel 205*c*_1 are removed.

In FIG. 4, a power-source housing section 207, which is formed integrally with the first housing 205 and exposed as the power supply block 206 is removed, is illustrated. Also, various circuit boards 208 are exposed since the back panel 205*c*_1 is removed. The power-source housing section 207 is disposed not to overlap any of these circuit boards 208. Further, in the notebook PC 100, the BT antenna 172 is attached in a space between a plate wall of the power-source housing section 207 and the side plate 205*b* of the first housing 205 of the main unit 200. The attached position of the BT antenna 172, which is a feature of the notebook PC 100, will be described later in detail with reference to another figure.

In the notebook PC 100, the attached position of the BT module 120 is right under the back panel 205*c*_1 illustrated in FIG. 3 and thus becomes immediately accessible upon removal of the back panel 205*c*_1. When the back panel 205*c*_1 is removed, the attached position of the BT module 120 appears as illustrated in FIG. 4. How to attach and detach the BT module 120, which is a feature of the notebook PC 100, will be described later in detail with reference to another figure.

First, the attached position of the BT antenna 172 will be described in detail.

Figure 5:
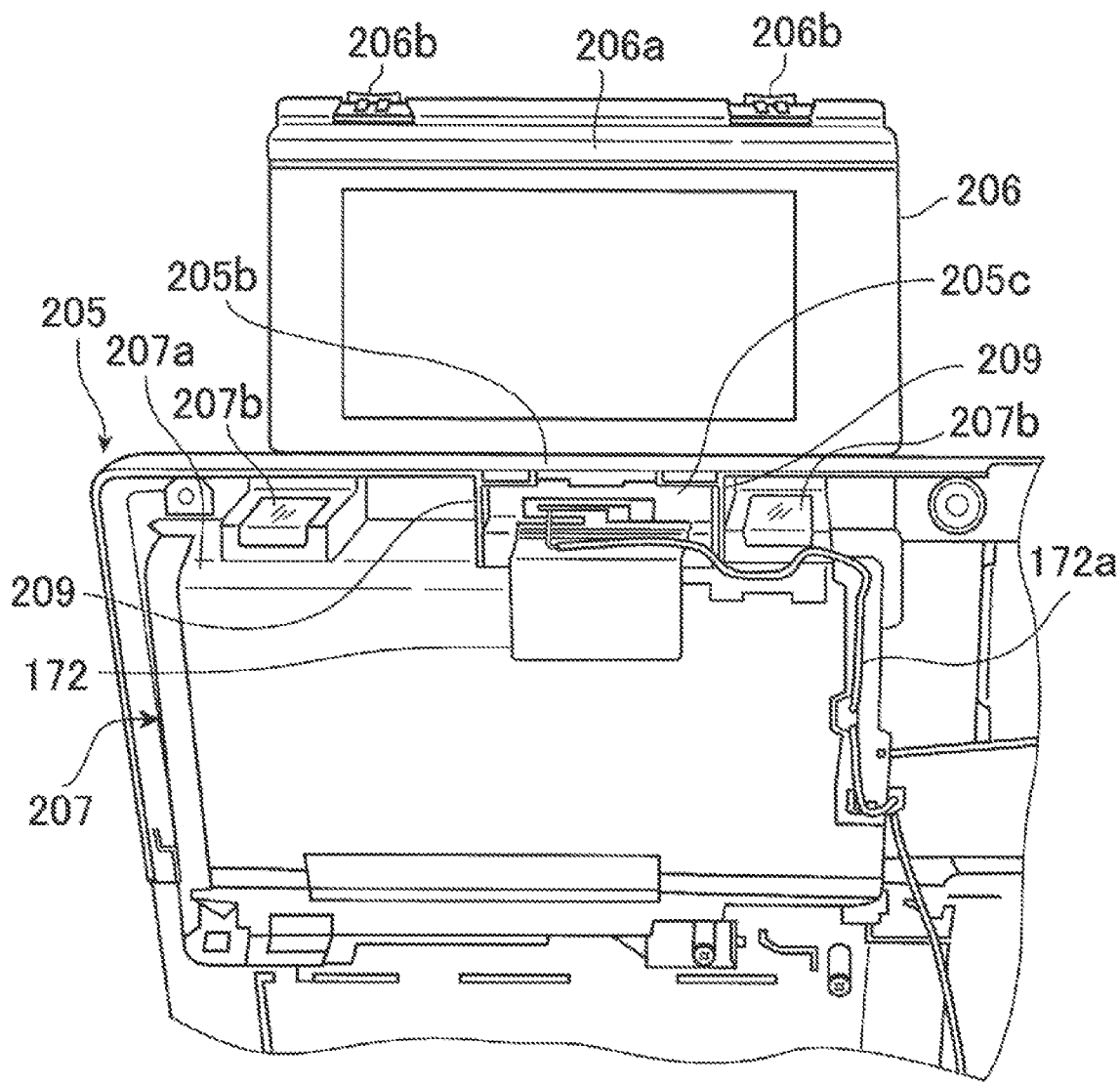
FIG. 5 is a diagram that illustrates an attached position of the BT antenna 172.

FIG. 5 is a diagram that illustrates the attached position of the BT antenna 172.

FIG. 5 illustrates a state in which the first housing 205 formed integrally with the power-source housing section 207 depicted in FIG. 4 is viewed from the top plate 205*a* illustrated in FIG. 1, i.e. viewed from the side opposite to the side where the power supply block 206 is installed. In FIG. 5, the top plate 205*a* and the like are removed so that the attached position of the BT antenna 172 is visible. FIG. 5 also illustrates a state in which the power supply block 206 removed from the power-source housing section 207 is viewed from the same direction as the direction from which the first housing 205 is viewed.

The power supply block 206 externally has a block shape like an approximately rectangular solid. The power supply block 206 contains two or more cylindrical batteries (battery cells) each having a central axis extending along the longitudinal direction of the block shape. The power supply block 206 has an outer wall surface 206a shaped like an arc that extends along the batteries. As illustrated in FIG. 5, the power supply block 206 has two locking pieces 206b that are capable of pressing outward and disposed at separate positions on one side of the power supply block 206. Corresponding to the shape of the power supply block 206, the power-source housing section 207 has: an arc-shaped plate wall 207a extending along the arc-shaped outer wall surface 206a of the power supply block 206; and a bottom part that connects to the plate wall 207a supporting the power supply block 206 in the attached state. Further, the power-source housing section 207 has two receipt portions 207b to be locked by the respective locking pieces 206b of the power supply block 206 when the power supply block 206 is attached to the power-source housing section 207, thereby preventing removal of the power supply block 206.

The arc-shaped plate wall 207a is formed at a position adjacent to the side plate 205b in the first housing 205. More particularly, the plate wall 207a is shaped like an arch that is closed to the side plate 205b on the bottom plate 205c side and is away from the side plate 205b on the top plate 205a side, in the direction connecting the bottom plate 205c illustrated in FIG. 3 with the top plate 205a illustrated in FIG. 1.

Further, the BT antenna 172 includes: a tabular first part that extends in the direction connecting the top plate 205a with the bottom plate 205c and has a length shorter than the radius of the arc of the plate wall 207a; and a tabular second part that extends from one end of the first part in the direction perpendicular to the first part and is positioned at the bottom part of the power-source housing section 207 when the BT antenna 172 is disposed in the space between the plate wall 207a and the side plate 205b. The BT antenna 172 further includes a third part that extends from the other end of the first part in the direction perpendicular to the first part and opposite to the second part.

As a result, between the arc-shaped plate wall 207a and the side plate 205b, an extra space is formed because the surface of the plate wall 207a gradually goes away from the side plate 205b along the ark shape of the plate wall 207a. By using this extra space and disposing the end of the first part connecting to the third part of the BT antenna 172 on the arc-shaped part of the plate wall 207a, the BT antenna 172 is housed without increasing the size of the notebook PC 100. In addition, there is also formed an extra space between the receipt portions 207b that are provided in the power-source housing section 207 corresponding to the locking pieces 206b of the power supply block 206 to prevent the removal of the power supply block 206. By using this space as well, the BT antenna 172 is housed without increasing the size of the notebook PC 100.

In the notebook PC 100, there are provided two partitions 209. The BT antenna 172 is flanked by these two partitions 209 when disposed between the plate wall 207a and the side plate 205b that over the front and back of the BT antenna 172. By these two partitions 209, for example, even when a physical shock is externally applied to the notebook PC 100, an influence of the shock on a periphery of the BT antenna 172 is curbed, preventing damage and the like of the BT antenna 172.

Also, as described above, the power-source housing section 207 is disposed not to overlap any of the various circuit boards 208 in the notebook PC 100. The BT antenna 172 is housed in the space between the plate wall 207a and the side plate 205b of the power-source housing section 207 disposed in such a manner. In other words, the BT antenna 172 is separated from the circuit boards 208 that are prone to electromagnetic interference, and disposed close to the power supply block 206 that is resistant to electromagnetic interference. As a result, electromagnetic interference with the circuit boards 208 by radio waves transmitted form and received by the BT antenna 172 is prevented. In this way, in the notebook PC 100, the BT antenna 172 is appropriately housed without increasing the size while preventing electromagnetic interference.

To the BT antenna 172, an antenna cord 172a is connected to transfer signals exchanged through wireless communication based on the Bluetooth (registered trademark) standard through the BT antenna 172. The antenna cord 172a is connected to an RF connector 120d (see FIG. 6) in the BT module 120.

Next, how to attach and detach the BT module 120 will be described in detail.

Figure 6:
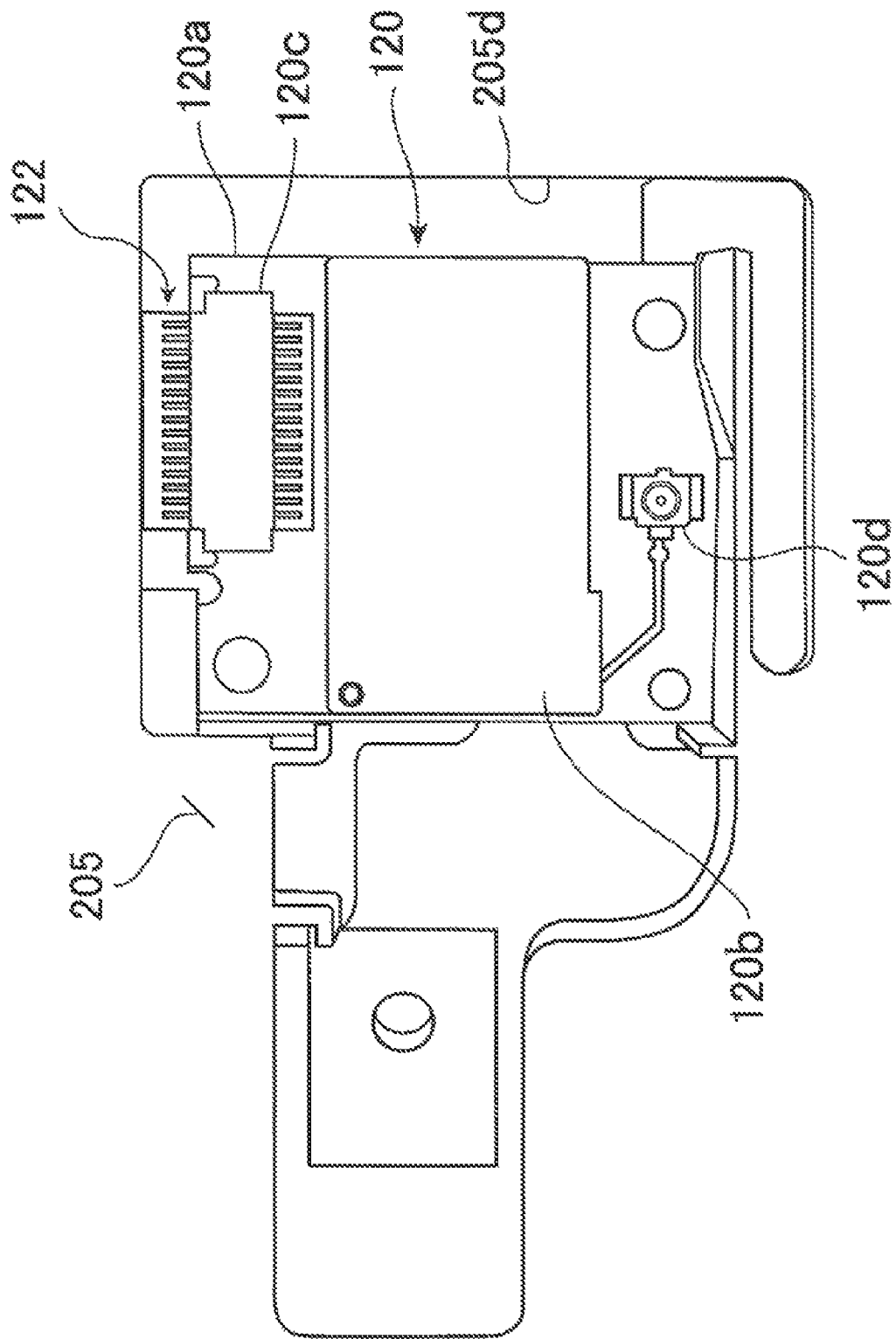
FIG. 6 is an enlarged view of the periphery of the BT module 120 illustrated in FIG. 4.

FIG. 6 is an enlarged view of the periphery of the BT module 120 in FIG. 4.

The BT module 120 includes a board 120a mounted with: a circuit element 120b that performs communication processing based on the Bluetooth (registered trademark) standard; a circuit connector 120c that serves as an interface of the BT module 120 to the outside; and the RF connector 120d to which the antenna cord 172a is connected. Further, a connection cable 122 that electrically connects the BT module 120 to the main unit 200 is attached to the circuit connector 120c.

In the first housing 205 of the main unit 200, there is a storage area 205d having a concave shape depressed in a direction perpendicular to the plane of the board 120a and spreading in parallel to the plane of the board 120a in a state in which the BT module 120 is attached. The BT module 120 is housed in the storage area 205d when attached.

Here, in the present embodiment, the BT module 120 to which the connection cable 122 is fixed serves as an attached part that is attached to the main unit 200 and also detached as required.

Next, how to attach the attached part to the main unit 200 will be described below.

Figure 7:
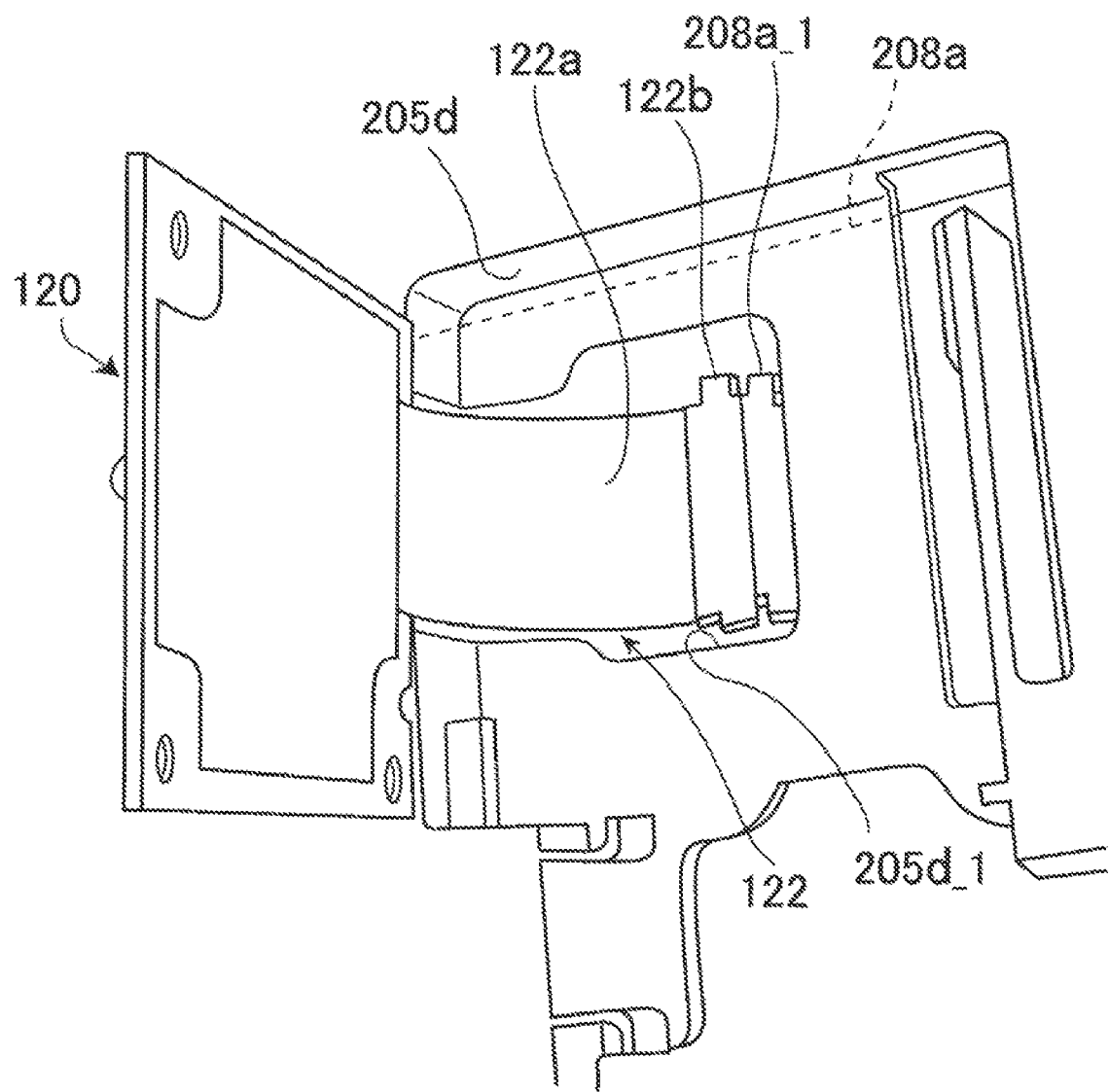
FIG. 7 is a diagram illustrating a first step in how to attach the attached part made up of the BT module 120 and a connection cable 122.
Figure 8:
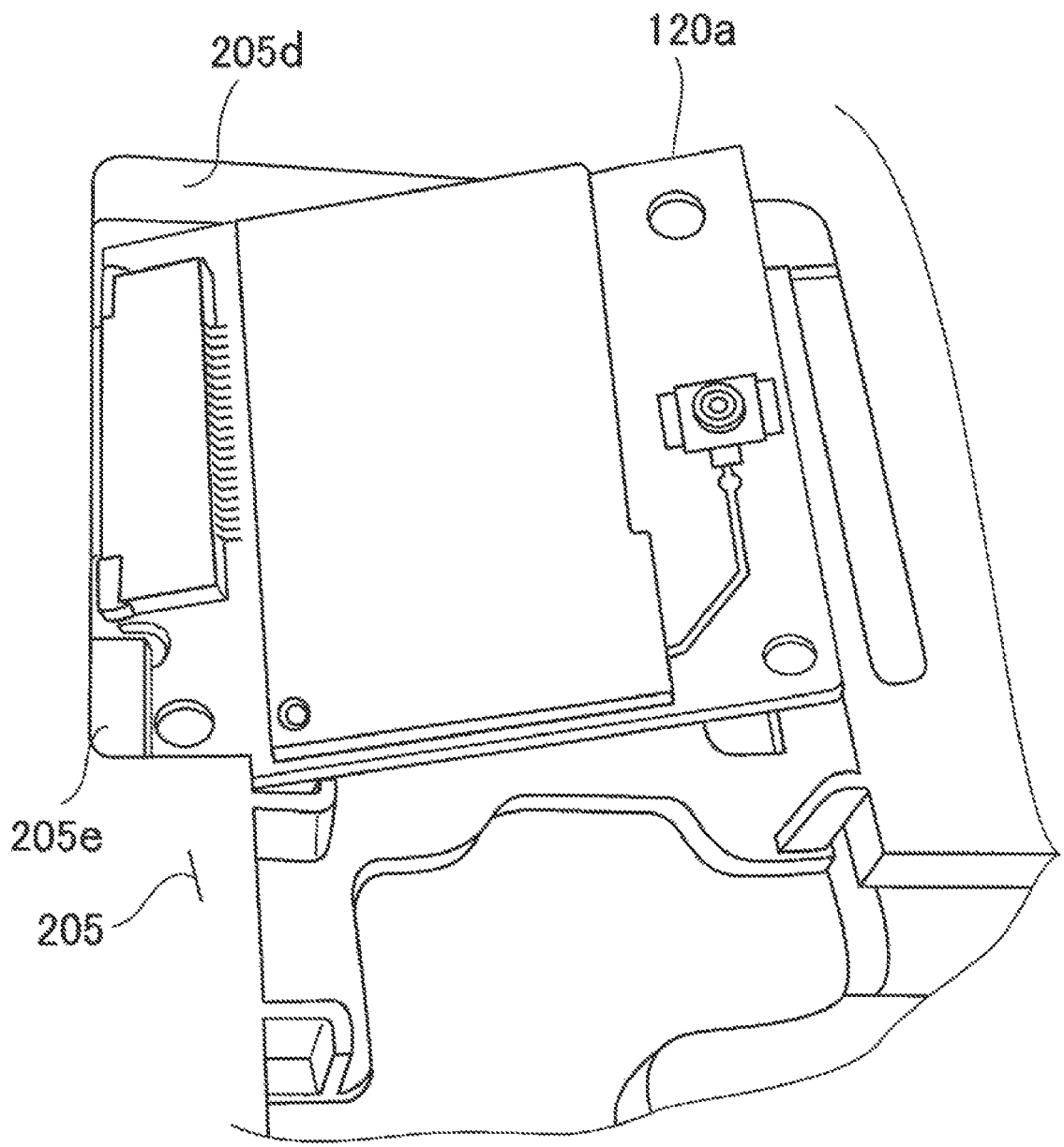
FIG. 8 is a diagram illustrating a second step in how to attach the attached part made up of the BT module 120 and the connection cable 122.
Figure 9:
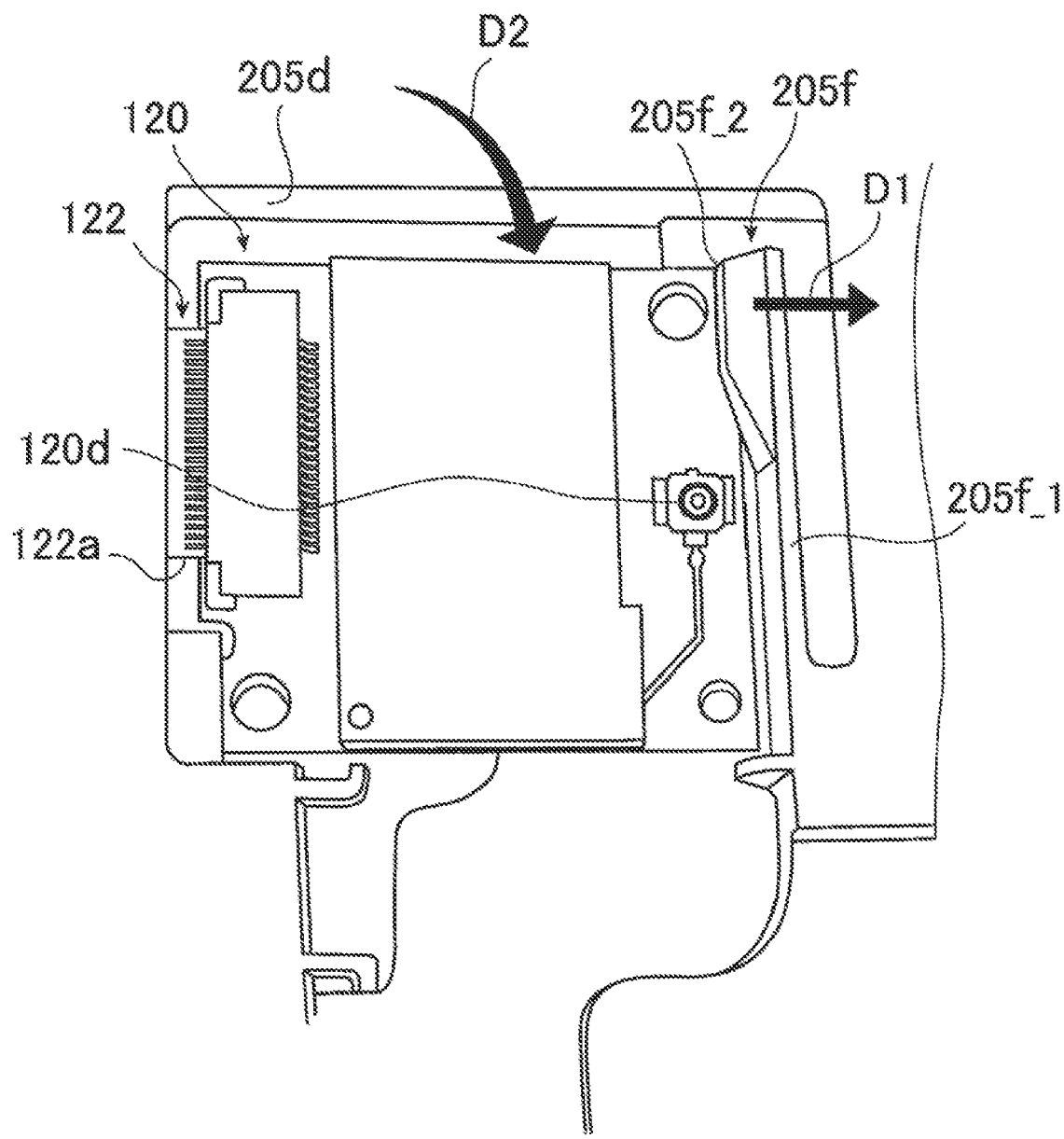
FIG. 9 is a diagram illustrating a third step in how to attach the attached part made up of the BT module 120 and the connection cable 122.

FIG. 7 is a diagram illustrating a first step in how to attach the attached part made up of the BT module 120 and the connection cable 122, FIG. 8 is a diagram illustrating a second step, and FIG. 9 is a diagram illustrating a third step.

The main unit 200 includes a communication circuit board 208a provided with a main-unit-side BT connector 208a_1 for exchanging signals with the BT module 120. When the BT module 120 is considered to be a first board corresponding to a child board, the communication circuit board 208a is considered to be a second board corresponding to a parent board for the first board. The communication circuit board 208a is connected to the circuit board 208 mounted with the CPU 111, and signals are exchanged through the BT module 120 under the control of the CPU 111. The storage area 205d described earlier is provided over the communication circuit board 208a, and an opening 205d_1 for accessing the main-unit-side BT connector 208a_1 is formed in the storage area 205d.

In the first step, the attached part made up of the BT module 120 and the connection cable 122 is attached to the main-unit-side BT connector 208a_1 in the following manner.

The connection cable 122 includes a cable body 122a shaped like a strip and having copper wires covered with an elastic material. At one end of the cable body 122a opposite to the other end where the BT module 120 is provided, there is a connection connector 122b connected to the main-unit-side BT connector 208a_1 of the main unit 200. In the first step, as illustrated in FIG. 7, the attached part is attached to the main-unit-side BT connector 208a_1 by connecting the connection connector 122b of the connection cable 122 to the main-unit-side BT connector 208a_1 of the main unit 200.

Subsequently, in the second step, the cable body 122a of the connection cable 122 is elastically bent in a longitudinal direction, and an end portion of the BT module 120 on the side where the connection cable 122 is provided is placed in the storage area 205d. At this point, this end portion placed in the storage area 205d is pushed, in a direction of going away from the storage area 205d, by the cable body 122a bent in the longitudinal direction.

Here, in the present embodiment, as illustrated in FIG. 8, a first holding piece 205e for retaining this end portion within the storage area 205d by holding down the end portion is provided at, among edges of the storage area 205d, an edge where the pushed end portion is positioned. In the second step, the cable body 122a is bent and, as illustrated in FIG. 8, a part of the end portion of the BT module 120 on the side where the connection cable 122 is provided is fit under the first holding piece 205e. As a result, the BT module 120 in a state in which the end portion is stored within the storage area 205d is stably disposed.

Subsequently, in the third step, an end portion of the BT module 120, opposite to the end portion where the connection cable 122 is provided, is placed in the storage area 205d. This end portion also is pushed, in a direction of going away from the storage area 205d, by the cable body 122a. In the present embodiment however, as illustrated in FIG. 9, a second holding piece 205f for retaining this end portion within the storage area 205d by holding down this end portion is provided at, among edges of the storage area 205d, an edge where this end portion is positioned.

The second holding piece 205f includes: a cantilever 205f_1 that is elastically deformed in a direction indicated with an arrow D1 illustrated in FIG. 9 when a force is applied in this direction: and a nail 205f_2 that is integrally formed with the cantilever 205f_1 at the tip of the cantilever 205f_1. The nail 205f_2 has a slope slanted downwardly toward the inside of the storage area 205d. This slope is provided at a portion to be touched by the end portion of the BT module 120 when the BT module 120 in the state depicted in FIG. 8 is pushed into the storage area 205d in a direction indicated with an arrow D2 illustrated in FIG. 9. Thanks to this slope, when the BT module 120 is pushed into the storage area 205d, a force is applied in the direction of the arrow D1 in FIG. 9 to the cantilever 205f_1, thereby causing the cantilever 205f_1 to be elastically deformed. Subsequently, when the BT module 120 is further pushed and the end portion of the BT module 120 goes beyond the extreme end of the slope of the nail 205f_2, the cantilever 205f_1 is restored to the original position. After the cantilever 205f_1 is restored to the original position, the end portion of the BT module 120 is fit under the nail 205f_2 and retained by the nail 205f_2 within the storage area 205d while being pushed by the cable body 122a. This completes the attachment of the attached part made up of the BT module 120 and the connection cable 122.

In this way, according to the present embodiment, the attached part is attached to the main unit 200 through the simple three steps: the first step in which the connection connector 122b of the connection cable 122 is connected to the main-unit-side BT connector 208a_1 of the main unit 200; the second step in which the cable body 122a is bent so that a part of the end portion of the BT module 120 on the side where the connection cable 122 is provided is fit under the first holding piece 205e; and the third step in which the end portion of the BT module 120 on the side opposite to the side where the connection cable 122 is provided is pushed into the storage area 205d.

Further, in the present embodiment, after the attached part is attached to the main unit 200 in the above-described manner, the antenna cord 172a (see FIG. 5) extending from the BT antenna 172 is connected to the RF connector 120d of the BT module 120.

Next, how to detach the attached part from the main unit 200 will be described.

In the notebook PC 100 of the present embodiment, the BT module 120 is removed from the main unit 200 when, for example, the BT module 120 is to be replaced with new one in the event of failure.

In this case, first, the antenna cord 172a (see FIG. 5) is disconnected from the RF connector 120d of the BT module 120. Subsequently, the cantilever 205f_1 of the second holding piece 205f in the attached state as illustrated in FIG. 9 is bent in the direction of the arrow D1, and the nail 205f_2 is disengaged from the end portion of the BT module 120. Then, the BT module 120 is pushed out from the storage area 205d by receiving the pressing force from the cable body 122a.

Figure 10:
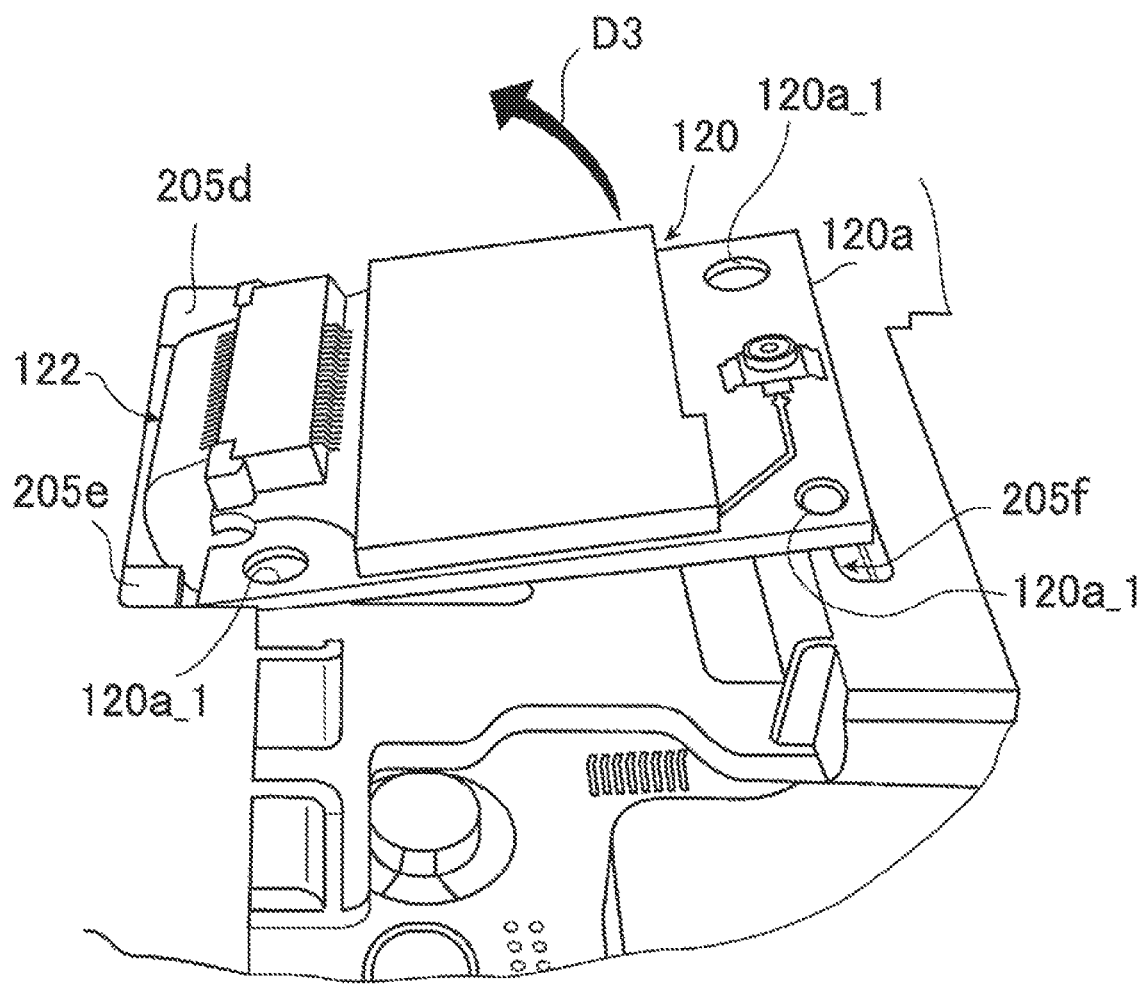
FIG. 10 is a diagram that illustrates a state in which the BT module 120 is pushed out from a storage area 205*d*.

FIG. 10 is a diagram that illustrates a state in which the BT module 120 is pushed out from the storage area 205d.

FIG. 10 illustrates the state in which not only the end portion of the BT module 120 held down by the second holding piece 205f, but also the opposite end portion of the BT module 120 on the side where the connection cable 122 is provided are pushed out from under the first holding piece 205e. The end portion (of the BT module 120) on the side where the connection cable 122 is provided may not come out from under the first holding piece 205e as illustrated in FIG. 10 by merely moving the nail 205f_2 of the second holding piece 205f. In this case, this end portion (of the BT module 120) on the side where the connection cable 122 is provided is then pulled out from under the first holding piece 205e.

When the BT module 120 comes out of the storage area 205d as illustrated in FIG. 10, the BT module 120 is raised in a direction indicated with an arrow D3 illustrated in FIG. 10 up to a position that allows the connection connector 122b and the main-unit-side BT connector 208a_1 of the main unit 200 to appear as illustrated in FIG. 7. Subsequently, the connection connector 122b is disconnected from the main-unit-side BT connector 208a_1, thereby completing the detachment of the attached part.

As described above, in the present embodiment, the attached part made up of the BT module 120 and the connection cable 122 is attached and detached without using components such as screws for attachment, thereby simplifying the work.

Incidentally, the attached part made up of the BT module 120 and the connection cable 122 is assumed to be used not only in the notebook PC 100 of the present embodiment but also in other types of notebook PC. It is conceivable that among these other types of notebook PC, there will be a type that allows only the attachment of the attached part using screws. Therefore, for this other type of notebook PC that allows only the attachment of the attached part using screws, three through holes 120a_1 to fasten screws not used in the notebook PC 100 of the present embodiment are formed in the board 120a of the BT module 120 as illustrated in FIG. 10 and other figures.

Alternatively, as another example different from the BT module 120 with the through holes 120a_1 to fasten screws, there may be provided a BT module having, instead of these through holes 120a_1, some kind of circuit component mounted on a space where each of the through holes 120a_1 to fasten screws would have been formed.

As described above, in the notebook PC 100 of the present embodiment, the BT antenna 172 is appropriately housed by using an extra space formed thanks to the arc shape of the plate wall 207a of the power-source housing section 207. Also, the attached part made up of the BT module 120 and the connection cable 122 is attached to and detached from the main unit 200 without using components such as screws for attachment, thereby simplifying the work. In other words, in the notebook PC 100 of the present embodiment, attachment and detachment of the BT module 120 is easy.

Incidentally, in the above description, the notebook PC has been used as an embodiment of the electronic apparatus of the present invention. However, the present invention is not limited to this embodiment and the electronic apparatus of the present invention may be, for example, a PDA and the like.

Also, in the above description, the BT antenna used for wireless communication based on the Bluetooth (registered trademark) standard has been used as an example of the antenna housed in the above-described extra space. However, the antenna housed in the extra space is not limited to the BT antenna and may be any other types of antenna such as a wireless LAN antenna used for wireless communication based on the IEEE 802.11 standard.

Also, in the above description, the attached part made up of the BT module and the connection cable used for wireless communication based on the Bluetooth (registered trademark) standard is employed as an example of the attached part to be attached and detached. However, the attached part is not limited to this example and may be any other types of component such as a wireless LAN module used for wireless communication based on the IEEE 802.11 standard and a circuit board mounted with a memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:
1. An electronic device, comprising:
   a keyboard that has a plurality of keys which are arranged vertically and horizontally on a first plane;
   a housing that forms an inner space, the housing includes:
      a first plate section which extends along the first plane on which the plurality of keys are arranged,
      a second plate section which extends along a second plane intersecting the first plane,
      an arc-shaped plate wall that has a first section extending in a direction that intersects the first plane and a second section extending in a direction that intersects the second plane, and
      a third plate section which continues to the arc-shaped plate wall; and
   an antenna that is housed in the inner space, the antenna includes:
      a first portion which has a plate shape, extends in a direction along the second plane, and has length shorter than a radius of an arc in the arc-shaped plate wall,
      a second portion which has a plate shape, extends from one end of the first portion in a direction along the first plane, and is positioned at the third plate section, and
      a third portion which extends from the other end of the first portion contacting the arc-shaped plate wall toward the second plate section in a direction along the first plane.

2. The electronic device according to claim 1, further comprising a circuit board in which an electronic circuit is mounted, and is placed at a position avoiding a space contained by the first plate section, the second plate section and the arc-shaped plate wall in the inner space.

3. The electronic device according to claim 1, wherein the arc-shaped plate wall and the third plate section form a housing section for a removably attachable component.

4. The electronic device according to claim 2, wherein the arc-shaped plate wall and the third plate section form a housing section for a removably attachable component.

5. The electronic device according to claim 3, wherein the removably attachable component is a battery pack which is a power supply for the circuit board.

6. The electronic device according to claim 4, wherein the removably attachable component is a battery pack which is a power supply for the circuit board.

* * * * *